US006228510B1

(12) United States Patent
Chen et al.

(10) Patent No.: US 6,228,510 B1
(45) Date of Patent: May 8, 2001

(54) COATING AND METHOD FOR MINIMIZING CONSUMPTION OF BASE MATERIAL DURING HIGH TEMPERATURE SERVICE

(75) Inventors: Keng N. Chen; Shih T. Ngiam; Genfa Hu, all of Singapore (SG)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/219,158

(22) Filed: Dec. 22, 1998

(51) Int. Cl.[7] ........................................ B32B 15/00
(52) U.S. Cl. .................... 428/615; 428/621; 428/652; 428/670; 428/678; 428/680; 416/241 R
(58) Field of Search .................. 428/615, 652, 428/670, 678, 679, 680, 621, 632, 472; 416/241 R

(56) References Cited

U.S. PATENT DOCUMENTS

| 3,544,348 | 12/1970 | Boone | 117/2 |
|---|---|---|---|
| 4,176,433 | 12/1979 | Lee et al. | 29/156.8 B |
| 4,897,315 | 1/1990 | Gupta | 428/552 |
| 4,965,095 | 10/1990 | Baldi | 427/142 |
| 5,116,691 | * 5/1992 | Darolla et al. | 428/614 |
| 5,516,380 | * 5/1996 | Darolla et al. | 148/404 |
| 5,716,720 | * 2/1998 | Murphy | 428/623 |
| 5,820,337 | * 10/1998 | Jackson et al. | 415/200 |
| 5,824,423 | * 10/1998 | Maxwell et al. | 428/623 |
| 5,975,852 | * 11/1999 | Nagaraj et al. | 416/241 R |

FOREIGN PATENT DOCUMENTS

| 04032546 | 2/1992 | (JP) . |
|---|---|---|
| 9605331 | 2/1996 | (WO) . |
| 9613622 | 5/1996 | (WO) . |

* cited by examiner

Primary Examiner—Deborah Jones
Assistant Examiner—Bryant Young
(74) Attorney, Agent, or Firm—Andrew C. Hess; Gerry S. Gressel

(57) ABSTRACT

An improved coating and method for applying the coating to minimize the consumption of substrate material during high temperature service by formation of an intermediate metal aluminide layer. A layer of Ni or Co or combinations of Ni and Co are added to the substrate material as an overlay by a process such as electroplating or electroless plating. A diffusion aluminide is then formed at the surface by exposing the plated substrate to a source of aluminum at an elevated temperature.

10 Claims, No Drawings

COATING AND METHOD FOR MINIMIZING CONSUMPTION OF BASE MATERIAL DURING HIGH TEMPERATURE SERVICE

FIELD OF THE INVENTION

This invention relates to gas turbine engines, and more particularly, to a diffusion barrier layer applied to airfoils in the turbine portion of a gas turbine engine.

DISCUSSION OF THE PRIOR ART

The current coatings used on airfoils exposed to the hot gases of combustion in gas turbine engines for both environmental protection and as bond coats in thermal barrier coating (TBC) systems include aluminides of nickel and platinum. These coatings are applied over substrate materials, typically nickel-base superalloys, to provide protection against oxidation and corrosion attack. These coatings are formed on the substrate in a number of different ways. For example, a nickel aluminide, NiAl, typically is grown as an outer coat on a nickel base superalloy by simply exposing the substrate to an aluminum rich environment at elevated temperatures. The aluminum diffuses into the substrate and combines with the nickel to form the outer coating of NiAl. A platinum aluminide (PtAl) coating is formed by electroplating platinum over the nickel-base substrate to a predetermined thickness. Then, exposure of the platinum to an aluminum-rich environment at elevated temperatures causes the growth of an outer layer of PtAl as the aluminum diffuses into and reacts with the platinum. At the same time, Ni diffuses outward from the substrate, while aluminum diffuses inward through the platinum. Thus, complex structures of (Pt,Ni) Al are formed by exposing a substrate electroplated with Pt to an atmosphere rich in aluminum at elevated temperatures. As the aluminum diffuses inward toward the substrate and Ni diffuses outward through the Pt, $PtAl_x$ phases precipitate out of solution so that the resulting Pt-NiAl intermetallic also contains precipitates of $PtAl_x$ intermetallic, where x is 2 or 3.

Aluminides are also used as bond coats in thermal barrier systems, being intermediate between the substrate and an additional thermally resistant ceramic coating such as yttria-stabilized zirconia (YSZ) which is applied over the aluminide. However, the process for forming these diffusion aluminides is essentially the same, that is to say, the substrate is exposed to aluminum, usually by a pack process or a CVD process at elevated temperatures, and the resulting aluminide is grown into the surface.

Over time in the hot gaseous environment of a gas turbine engine, the coatings, whether applied as an environmental coating or as a bond coat in a thermal barrier system eventually degrade as a result of one or a combination of ongoing processes: erosion due to the impingement of hot gases on the airfoils; corrosion due to reaction of contaminants in the products of combustion with the airfoil surfaces; and oxidation. In order to repair an airfoil after service, it is necessary to remove not only the corrosion products and oxidation products, but also the previously applied coatings, if they haven't already been removed. Because the coatings are grown into the substrate by a diffusion process, this involves removing a portion of what was once substrate material. Because the parts are thin, this repair process limits the number of times that the airfoils can be reused since minimum allowable wall thicknesses cannot be violated.

What is desired is a method of forming protective aluminide coatings on airfoils for use in gas turbine service in which the growth of the coating into the substrate is either eliminated or minimized.

BRIEF SUMMARY OF THE INVENTION

The present invention is directed toward a protective coating that at once provides a protective coating for a nickel-based superalloy substrate and simultaneously acts as a diffusion barrier for superalloy components, such as airfoils, used in gas turbine applications.

An advantage of the present invention is that it extends the life of a turbine airfoil by reducing the growth of the protective aluminide coating into the substrate material. This permits the subsequent removal of the coating to occur with minimal impact on the initial wall thickness of the airfoil, so that the airfoil life can be extended through additional repair cycles in excess of the number that currently can be performed.

Another advantage of the system of the present invention is that the diffusion barrier layer slows the outward migration of alloying elements such as Co, Cr, W, Re, Ta, Mo and Ti from the substrate during high temperature operation so that the mechanical and metallurgical properties of the substrate is maintained.

Still another advantage of the system of the present invention is that the diffusion barrier layer retards the inward migration of aluminum from the coating so that the aluminum content of the coating is not depleted as rapidly as might otherwise occur.

The present invention provides for an article for use in a high temperature oxidative environment such as is found in a gas turbine engine comprising a nickel base superalloy substrate. Overlying the nickel base superalloy substrate is a tightly adherent metallic coating comprised of cobalt or nickel, or combinations of cobalt and nickel. The metallic layer is applied over the substrate and an outer coating of aluminide is formed by exposing the metallic layer to a high concentration of aluminum at an elevated temperature. The aluminum thus has to diffuse through the aforesaid metallic coating comprised of Co, Ni, or combinations of Co and Ni, retarding or delaying its reaction with the superalloy substrate.

The metallic diffusion barrier layer of the present invention may be applied to new airfoils prior to aluminiding or it may be applied to airfoils removed from service as part of the repair cycle. The metallic diffusion barrier of the present invention would be applied after removal of preexisting coatings for airfoils removed from service.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention comprises depositing a thin layer of a metal selected from the group consisting of Co, Ni or combinations of Co and Ni over the surface of a turbine engine component such as an airfoil prior to the formation of a protective aluminide coating. Typically components such as airfoils are manufactured of superalloys, and frequently well-known Ni-base superalloys such as Rene 80, Rene N5, Rene N6, Rene 142 and Rene 162. These superalloys include a number of alloying elements. The nominal composition of Rene 80, for example, is, in weight percent, 0.17% C, 0.2% Mn, 0.2% Si, 14% Cr, 9.5% Co, 3% Al, 5.0% Ti, 4.0% Mo, 0.2% Fe, 0.015% B, 0.03% Zr, 4% W and the balance Ni and incidental impurities. Other superalloy substrate materials include similar elements in various weight percentages. When Co, Ni or combinations thereof is applied over the surface of an airfoil, it serves initially as a new surface into which a protective aluminide coating is grown. Of course, as is well known in the gas turbine arts, the aluminide coating may serve as an environmental coating for such an airfoil, or it may serve as a bond coat underlying a thermal barrier topcoat. When the engine is taken out of service for repair or refurbishment, it is necessary to remove existing coatings, as well as any oxidation or combustion products that may have formed on the outer surfaces of the turbine component parts in order to accomplish a refurbishment. Thus, in the present invention, the applied metal is sacrificial in that it is used to form the aluminide protective coating and minimizes the amount of substrate material that is removed during refurbishment. Of course, for existing turbine components, the Ni, Co or combinations of Co and Ni may be added after removal of the existing coatings, which have been grown into the substrate using existing procedures. This added metal serves to replace the removed substrate material and permits a new protective coating to be grown into the added metal rather than directly into the substrate, which has already experienced thinning as a result of conventional aluminiding and removal. In addition, the added metal acts as a diffusion barrier to limit the inward migration of Al so that a minimal amount of substrate is consumed in forming the protective aluminide coating and during service.

The temperature of operation of a gas turbine in the turbine portion of the engine is sufficiently high, about 2000° F. and higher, that the effects of diffusion processes cannot be ignored. At these temperatures, there is a tendency for aluminum, which is added by a pack powder process or other equivalent process to form an aluminide outer protective surface, to diffuse through the aluminide layer and migrate into the substrate. There is also a tendency for substrate elements such as Co, W, Re, Ta, Y, V Mo, etc., to diffuse away from the substrate when present through the aluminide layer to the outer surface where they form oxides that are not tightly adherent. This diffusion process results in an adverse effect on the aluminide protective layer in that it becomes depleted of aluminum, altering its ability to act as a protective surface, and it alters the composition of the underlying substrate in that a diffusion zone is formed in which the chemical and hence mechanical properties are altered. Because the diffusion process is time and temperature dependent, a relatively thick layer of Ni is preferred in order to slow the effects of the diffusion process. In another preferred embodiment, a thin layer of Co is applied to slow the effects of the diffusion process, since the diffusion of aluminum inward through the cobalt layer and the diffusion of the alloying elements outward through the cobalt layer is significantly slower. Thus, a thin layer of cobalt serves both as an effective surface for formation of an aluminide protective coating and as a diffusion barrier to inhibit the migration of aluminum inward toward the substrate and alloying elements outward away from the substrate.

When the present invention is used to repair a superalloy component removed from service from a gas turbine, it is first necessary to remove the oxidation and corrosion products that may have built up on the outer surface as a result of exposure to the hot gases of combustion and other contaminants. This is usually accomplished by degreasing and grit blasting. It is then necessary to remove the coatings from the exterior surfaces of the component. This may include thermal barrier coatings such as yttria-stabilized zirconia, which is removed by grit blasting, and aluminide bond coats or aluminide environmental coatings. Removal of aluminide coatings is usually accomplished by acid stripping or fluoride ion cleaning (FIC). Of course, since many prior art aluminides were applied by growing the aluminide into the substrate, this removal process reduces the thickness of the substrate.

Subsequent to removal of the coatings and FIC, refurbishment of superalloy components is virtually identical to preparation for service of new turbine components. These components are typically airfoils such as turbine blades or vanes. A thin layer of a metal, either Ni, Co or combinations of Co and Ni is deposited over the surface of the component to coat the surface. As noted above, since Al and other elements diffuse through Co slower than through Ni, a thicker layer of Ni is required to effectively slow diffusion sufficiently to be effective. The thickness of the deposited metal will vary from about 2 to about 60 microns, it being understood that Co is applied at the lower end of the thickness range and the Ni is applied at the higher end of the thickness range, there being an overlap in thicknesses at intermediate ranges. The metal may be deposited by any convenient technique that produces a high quality, uniform coating thickness. These processes include electroplating, physical vapor deposition, electroless plating and chemical vapor deposition. It will be recognized that certain trace impurities that do not adversely affect the characteristics and operation of the present invention may be present in the deposited metal.

After deposition, the metal-coated component is exposed to a source of aluminum at an elevated temperature so that a diffusion aluminide forms by reacting with the outer surface of the metal. The diffusion aluminide may be grown by any of the well-known and time-tested methods for growing these coatings, such as subjecting the component to a pack process or an over-the-pack process. Other successful methods include chemical vapor deposition and vapor phase aluminiding. Of course, it will be understood by those skilled in the art, that over time, Ni from the substrate will diffuse through the Co as will Al from the coating, forming complex (Co,Ni)Al aluminides through the coating. The aluminide coating thickness will vary depending upon the alloy system, but typically has a thickness after exposure to the aluminum source of about 2–90 microns.

When Ni is applied in sufficient thickness, it can act to slow diffusion of Al from the outer surface to the substrate, and will also minimize the effect on the underlying substrate. However, the present invention is most effective when used to take advantage of the diffusion barrier characteristics of Co. In a preferred embodiment, a thin layer of Co is applied over the substrate, typically to a thickness of about 2–10 microns and most preferably to a thickness of about 10 microns. A diffusion aluminide coating is then formed as set forth above. In this embodiment, the Co acts as a diffusion barrier slowing down the diffusion of aluminum into the superalloy substrate. The aluminide coating thus formed will have a reduced thickness compared to that when the substrate is coated in the absence of a diffusion barrier. When a component coated by this method is next repaired, a smaller amount of material will have to be removed compared to components coated by conventional methods.

In another preferred embodiment, a thin layer of Co is applied over the substrate, typically to a thickness of about 1–10 microns and most preferably to a thickness of about 10 microns. Then, a thin layer of a metal selected from the group consisting of Ni and Pt is deposited over the Co. The thickness of this second layer will vary from about 2–25 microns. Most preferably, when Pt is deposited, it is applied to a thickness of about 5–10 microns. These metal layers are deposited as set forth above using typical metal application techniques. An aluminide coating is then formed as set forth above. In this embodiment, the outer metal layer, whether Ni or Pt, form a protective aluminide. However, during subsequent high temperature exposure, the Co acts as a diffusion barrier. As Al diffuses inward from the aluminide, an additional protective coating of CoAl is formed at the surface, which becomes a complex aluminide coating of either (Ni,Co)Al or (Pt,Co)Al over time, depending upon whether Ni or Pt is deposited over the Co. This complex aluminide will grow from the outer Co surface. Since Al diffuses faster than Ni, over time Al diffusing inward from the outer aluminide and Ni diffusing outward from the substrate will combine within the Co to form a further complex of NiAl in the vicinity of the Co/substrate interface. However, the effects of Co as a diffusion barrier are such that this reaction is relatively insignificant and the effect of this reaction at the Co/substrate interface is minimal as compared to current practices.

The overall effects of the coatings of the present invention are to provide an effective protective aluminide coating to the superalloy turbine component for use in gas turbine applications so that the effects on the dimensional integrity of the component is minimized, while at the same time minimizing the adverse effects of the hot gas turbine environment on the superalloy substrate material so that the chemical and hence mechanical properties of the substrate are substantially maintained. Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A superalloy turbine component for use in a gas turbine engine, comprising:
   a superalloy base material substrate;
   a diffusion barrier layer comprised of an element selected from the group consisting of Ni, Co and combinations thereof overlying the superalloy base material substrate;
   a diffusion aluminide coating overlying the superalloy base material substrate, the diffusion aluminide coating formed by exposing the diffusion barrier layer overlying the superalloy base material substrate surface to an aluminum source at an elevated temperature, so that the diffusion aluminide coating is substantially grown by diffusion of aluminum into an outer surface of the diffusion barrier layer exposed to the aluminum source while outward migration of alloying elements from the superalloy base material substrate is substantially reduced by the diffusion barrier layer and the dimensional and chemical integrity of the superalloy base material substrate is substantially maintained.

2. The superalloy turbine component of claim 1 in which the diffusion barrier layer overlying the superalloy base material substrate is formed by first depositing a thin layer of Co over the superalloy base material substrate, and then depositing a thin layer of an element selected from the group consisting of Ni and Pt over the thin layer of Co prior to exposing the outer surface of the diffusion barrier layer to the aluminum source to form the diffusion aluminide coating.

3. The superalloy turbine component of claim 2 wherein the thin layer of Co deposited over the superalloy base material substrate has a thickness of from about 2–10 microns before exposing the outer surface of the diffusion barrier layer to the aluminum source to form the diffusion aluminide coating.

4. The superalloy turbine component of claim 2 wherein the thin layer of an element selected from the group consisting of Ni and Pt has a thickness of from about 2–25 microns before exposing the outer surface of the diffusion barrier layer to the aluminum source to form the diffusion alumninide coating.

5. The superalloy turbine component of claim 1 further comprising a thermal barrier coating overlying the diffusion aluminide coating.

6. The superalloy turbine component of claim 1 wherein the diffusion barrier layer overlying superalloy base material substrate has a thickness of from about 2–50 microns before exposing the outer surface of the difflusion barrier layer to the aluminum source to form the diffusion aluminide coating.

7. The superalloy turbine component of claim 6 wherein the diffusion barrier layer overlying the superalloy base material substrate has a thickness of from about 2–10 microns before exposing the outer surface of the diffusion barrier layer to the aluminum source to form the diffusion aluminide coating.

8. The superalloy turbine component of claim 7 wherein the diffusion barrier layer overlying the superalloy base material substrate has a thickness of about 10 microns before exposing the outer surface of the diffusion barrier layer to the aluminum source to form the diffusion aluminide coating.

9. The superalloy turbine component of claim 1 wherein the superalloy base material substrate is a Ni-base superalloy selected from the group consisting of Rene 80, Rene N5, Rene N6, Rene 142 and Rene 162.

10. The superalloy component of claim 1 wherein the substantial reduction of outward migration of alloying elements from the superalloy base material substrate by the diffusion barrier layer includes at least one alloying element selected from the group consisting of Co, Cr, W, Re, Ti, Ta, Y, V and Mo.

* * * * *